United States Patent Office 3,786,096
Patented Jan. 15, 1974

3,786,096
RECOVERY OF ADIPIC ACID
Kazuhiko Konno, Ibaraki-ken, Japan, assignor to Mitsubishi Petrochemical Company Limited, Tokyo-to, Japan
No Drawing. Filed Mar. 1, 1971, Ser. No. 120,048
Claims priority, application Japan, Mar. 24, 1970, 45/24,738
Int. Cl. C07c 51/48
U.S. Cl. 260—537 R          6 Claims

ABSTRACT OF THE DISCLOSURE

A dibasic-acid mixture comprising adipic acid and succinic acid is subjected to an extraction operation wherein use is made of an extractant system comprising water and cyclohexanone and/or cyclohexanol thereby to cause preferential extraction of adipic acid into an organic phase.

BACKGROUND OF THE INVENTION

This invention relates generally to adipic acid and more particularly to a new and advanced process for separating and recovering adipic acid with high efficiency from dibasic acid mixtures containing adipic acid and succinic acid.

Still more particularly, this invention relates to a novel and advanced process for separating and recovering with high efficiency adipic acid from dibasic acid mixtures containing adipic acid, glutaric acid, and succinic acid obtained in the production of adipic acid by oxidizing cyclohexanone and/or cyclohexanol.

In the production of adipic acid by oxidizing cyclohexanone or a mixture thereof with cyclohexanol by air or nitric acid, the greater part of the adipic acid can be obtained with high purity in the form of crystals (first crystals) by crystallizing the resulting oxidized product. Adipic acid is still dissolved in the resulting mother liquor, and approximately one-half of this adipic acid can be recovered with relatively high purity in crystalline form (second crystals) by concentrating this mother liquor to approximately one-half volume and causing crystallization.

However, a further concentration and crystallization of the resulting mother liquor produces crystals (third crystals) which contain high contents of glutaric acid and succinic acid and, moreover, are highly colored in the case of oxidation by air.

Furthermore, in the purification of the adipic acid by recrystallization, glutaric acid and succinic acid together with a small quantity of impurities accumulate in the mother liquor as long as the mother liquor is recirculated. For this reason, it is necessary to remove a portion of the mother liquor from the circulation path.

The glutaric acid and succinic acid contents of the adipic acid crystals obtained from this mother liquor also become high.

Methods for recovering adipic acid from dibasic acid mixtures obtained from these mother liquors of oxidation reaction and recrystallization, include the recrystallization method, the distillation method, and the extraction method.

By the recrystallization method, the content of adipic acid in the dibasic acid mixture is estimated to be less than 70 percent, wherefore the separation recovery of the adipic acid by recrystallization is very inefficient.

By the distillation method, there arises the disadvantageous necessity of resorting to extremely complicated apparatus and operation because of the extremely high boiling points of dibasic acids (the boiling point of adipic acid being 206° C. at 10 mm. Hg). Furthermore, this method is accompanied by other difficulties such as the tendency of the distillation apparatus to become clogged by the deposition of the dibasic acids which are solid and the poor heat stability of dibasic acids, particularly adipic acid. For these reasons, the distillation method is not a desirable method in this case.

The extraction method has been proposed (as described in the specification of British Pat. No. 982,751) as an improvement over the above-mentioned methods. This extraction method comprises subjecting an aqueous solution of a dibasic acid mixture to an extraction process wherein a $C_4$ to $C_{15}$ linear-chain alcohol or an ester thereof is used as an extractant thereby to extract adipic acid. However, by this method also, a process step for separating the extractant and the extracted adipic acid, that is, a distillation step or a crystallization step, becomes unavoidable for isolating the adipic acid as crystals. Consequently, the apparatus for carrying out this method becomes complicated.

Furthermore, when this extraction method is used in the case of a dibasic-acid mixture obtained by air oxidation, the adipic acid thus isolated is of poor quality and, moreover, is extremely difficult to purify for polymer use. Even when the crystals thus isolated by this method are mixed with the first crystals and the resulting mixture is purified by the same method as that used in purifying the first crystals, the quality of the resulting product does not reach that for polymer use. Accordingly, in the case where a product quality for polymer use is desired, an additional stage of purifiction becomes necessary for these isolated crystals. This necessity is a great process disadvantage.

SUMMARY OF THE INVENTION

It is an object of this invention to overcome the above described difficulties by utilizing my discovery that a system comprising cyclohexanone and/or cyclohexanol and water is an excellent extractant.

According to the present invention, briefly summarized, there is provided a process for recovering adipic acid which is characterized in that a dibasic-acid mixture comprising adipic acid and succinic acid is caused to undergo an extraction process by means of an extractant system comprising (1) water and (2) cyclohexanone and/or cyclohexanol thereby to extract adipic acid preferentially into an organic phase.

The nature, principle, and utility of the invention will be more clearly apparent from the following detailed description beginning with general aspects and features of the invention and concluding with specific examples of practice illustrating preferred embodiments of the invention and one comparison example.

DETAILED DESCRIPTION

The extractant according to this invention is superior to known $C_4$ to $C_{15}$ linear-chain alcohols from the general viewpoint of partition coefficient and selectivity as described hereinafter, and the solution of adipic acid obtained thereby can be directly utilized for various reasons as a solution or the adipic acid can be recovered therefrom.

In addition to the excellent properties possessed by this water-cyclohexanone and/or cyclohexanol system as an extractant, there is afforded the advantage of the organic extracting component being a starting material for the production of adipic acid according to one mode of practice of this invention.

More specifically, in accordance with one embodiment of this invention, the above described extraction operation is applied to a dibasic acid mixture (containing succinic acid, glutaric acid, and others in addition to adipic acid) obtained by an adipic acid production process wherein cyclohexanone and/or cyclohexanol are/is oxidized, and the resulting adipic acid solution or the extract is recirculated to the adipic acid crystallization step of the aforementioned process or to, the oxidation reaction step, recirculation to the oxidation reaction step being the most preferable. Also, the extractant can be recirculated to the oxidation reaction after recovery of the adipic acid therefrom.

By this mode of practice, the extracted adipic acid, together with the adipic acid formed, is recovered in the adipic acid crystallization step as adipic acid crystals as a product of the adipic acid production process, whereby a process step of separating the organic extractant and the extracted adipic acid and a step of purifying the extracted adipic acid become unnecessary in the extraction process itself. Accordingly, the difficulties heretofore accompanying the extraction method are all overcome.

Heretofore, a difficulty was encountered in the selection of the extractant for adipic acid in that there was almost no knowledge concerning the partition coefficients in water-solvent systems of adipic acid, glutaric acid, and succinic acid. Solvents of hitherto known partition coefficient are few in number, examples being n-butanol, ethyl acetate, ether, and chloroform (as described in "Jikken Kagaku Koza Kiso-Gitjutsu II" (Experimental Chemistry Course, Basic Technology II), p. 346, published by Maruzen, K.K., Japan), and methylisobutyl ketone and methylisobutylcarbinol (as described in J. Org. Chem., 17, 1352).

In extraction in general, the partition coefficient and the selectivity (ratio of partition coefficient of the solute) are important, and it is desirable that both be of amply high values. These values with respect to a number of extractants are set forth in the following table. In this table, the n-butanol is the extractant recommended in the British Pat. No. 982,751, while the values for cyclohexanone and cyclohexanol are those which I have measured. The mixture ratio of the mixture of cyclohexanone and cyclohexanol is 1/1 by weight.

| | Partition coefficient [1] | | Selectivity, adipic acid/ succinic acid |
|---|---|---|---|
| | Adipic acid | Succinic acid | |
| Water-n-butanol | 3.20 | 1.21 | 2.64 |
| Water-ether | 0.45 | 0.125 | 3.60 |
| Water-cyclohexanone | 3.40 | 1.07 | 3.18 |
| Water-cyclohexanol | 3.83 | 0.989 | 3.86 |
| Water-(cyclohexanone plus cyclohexanol) | 4.54 | 1.35 | 3.36 |

[1] Solvent phase/water phase.

According to the values set forth in this table, the selectivity of ether is higher than that of n-butanol, but the partition coefficients of ether are low. For this reason, it is difficult to utilize ether industrially as an extractant. That is, it may be said that prediction of extractant effective in the extraction separation of these dibasic acids is extremely difficult. Accordingly, the fact that the extractants which I have discovered as superior to $C_4$ to $C_{15}$ linear-chain alcohols known heretofore on the combined points of partition coefficient and selectivity was quite unexpected.

Furthermore, since the extractant is cyclohexanone and/or cyclohexanol, which are starting materials for producing adipic acid, it is possible to oxidize and destroy the extractant as a measure for separating the extracted adipic acid and the extractant. That is, in accordance with one embodiment of this invention, the extract, still containing adipic acid, is recirculated as an oxidation starting material to the reaction system, and cyclohexanone and/or cyclohexanol, which are used as extractants, are converted into adipic acid, and the adipic acid thus formed and the additional extracted adipic acid can be recovered together as crystals in the crystallization step. Heretofore, the destruction of the extractant as a method of separating the extracted substance and the extractant has never been attempted as far as I am aawre.

As was mentioned hereinbefore, dibasic acid mixtures obtained by air oxidation are of poor quality for polymerization, and recirculation of the extract, as obtained, directly to the reaction system will give rise to the possibility of further lowering of the quality of the resulting adipic acid. However, it has been confirmed that when the adipic acid extracted by the process of this invention is recirculated together with the extractant to the reaction system, a quality suitable for polymers can be attained by the same purification process as that for the first crystals in the case where recirculation is not carried out.

Thus, the recirculation of the extract to the oxidation reaction system not only causes the separation of the extracted adipic acid and the extractant but also effects purification of the extracted adipic acid. This result was quite unexpected.

The dibasic acid mixtures to which this invention can be applied in obtaining this result are those containing succinic acid as well as adipic acid. Mixtures containing coexisting substances other than succinic acid can also be used. Actually, the products of the oxidation of cyclohexanone and/or cyclohexanol, which are specific examples of preferable dibasic-acid mixtures undoubtedly contain glutaric acid, monobasic acids, and other substances in addition to adipic acid and succinic acid.

In general, the dibasic-acid mixtures to which this invention can be applied are those comprising from 20 to 70 percent of adipic acid, from 20 to 70 percent of succinic acid, and from 0 to 70 percent of glutaric acid, all percentages being based on the weight of the dibasic-acid mixture.

A dibasic-acid mixture of this character is subjected to an extraction operation in accordance with this invention whereby the adipic acid is preferentially extracted into the organic phase, that is, the cyclohexanone and/or cyclohexanol phase. The above-mentioned coexisting dibasic acids are extracted in the water phase. In this case, it is preferable to use the dibasic-acid mixture in the state in which it is obtained, as an aqueous solution (in which mineral acids and monobasic organic acids such as acetic acid may be present as in aqueous solutions of nitric acid), or as a solution of cyclohexanone and/or cyclohexanol. However, it is also possible to use the dibasic acids in the form of a solution thereof in other solvents as, for example, a small quantity of methanol, provided that the properties or characteristics of the water-cyclohexanone and/or cyclohexanol system are not remarkably changed.

The proportions of the cyclohexanone and the cyclohexanol, constituting one component of the extractant system may be of any value (including one of the two used singly) as is apparent from the previously set forth table. Accordingly, it is advantageous to use cyclohexanone and/or cyclohexanol in the same proportion as that of the starting material to be oxidized in the adipic acid production. The water constituting the other component of the extractant system may contain therein other solvents such as monobasic acids or mineral acids provided that they do not appreciably impair the practice of this invention.

The ratio by weight of the water to the cyclohexanone and/or cyclohexanol in the extractant system according to the invention is from 0.1 to 20, preferably from 0.5 to 10. The extraction temperature is any temperature at which the dibasic acids do not deposit and, moreover, the extractant can exist as a liquid. Since a higher extraction temperature results in a higher solubility, extraction affords the advantage of a reduction in the size of extraction apparatus. Accordingly, it is also possible to carry out the extraction under pressure if necessary. Ordinarily, the extraction is carried out at a temperature of from room temperature to 120° C.

While the extraction is preferably carried out by a continuous counter-current extraction process, any of the various batch, continuous, and multiple-stage extraction processes known heretofore can also be used, provided that it is a process in which fractional extraction is carried out. For example, it is also possible to use a process wherein an aqueous solution of a dibasic acid is extracted with cyclohexanone and/or cyclohexanol, and the resulting extract is further extracted with water. I have found that in the extraction process of this invention, similar results are obtained irrespective of whether water is used in a continuous phase or whether cyclohexanone and/or cyclohexanol are/is used in a continuous phase.

Furthermore, it is possible to retort to any operational procedure, provided it is not a departure from or detrimental to the purpose of this invention. For example, in order to facilitate two-phase separation by increasing the difference between the specific gravities of the water and of the cyclohexanone and/or cyclohexanol, it is possible to add a salt such as sodium chloride to the water or to add a substance, such as cyclohexane, which will not impair the oxidation reaction to the cyclohexanone and/or cyclohexanol.

Among the components of the dibasic acid mixture separated in this invention, glutaric acid has a much higher solubility in organic solvents than the other acids, namely, adipic acid and succinic acid. Accordingly, it is also possible to extract and separate beforehand the glutaric acid with an organic solvent such as benzene, nitrobenzene, or chloroform prior to the extraction of the invention and then to carry out the process of the invention with respect to resolving the mixture comprising principally of the remaining adipic acid and succinic acid.

In the extraction process of this invention, glutaric acid and succinic acid are recovered in the water phase, and the mixture of these dibasic acids can be readily separated into glutaric acid and succinic acid and thus recovered by a known distillation or extraction process.

In order to indicate still more fully the nature and utility of this invention, the following specific examples of practice constituting preferred embodiments of the invention and results are set forth, it being understood that these examples are presented as illustrative only and that they are not intended to limit the scope of the invention.

EXAMPLE 1

An aqueous solution of a mixture (1:1 weight ratio) of adipic acid and succinic acid is supplied into the middle part of an extraction column of a theoretical number of plates of 5, and through the upper and lower ends of the column, respectively, water and a mixture (1:1 weight ratio) of cyclohexanone and cyclohexanol are introduced to carry out continuous counter-current extraction.

In an actual instance of practice with an extraction temperature of 50° C. and a ratio by weight of water to the mixture of cyclohexanone and cyclohexanol of 1.5, the quantities of adipic acid and succinic acid extracted into the mixture of cyclohexanone and cyclohexanol was 90.2 percent and 13.6 percent, respectively.

EXAMPLE 2

A solution of a mixture of adipic acid, glutaric acid, and succinic acid (weight ratio of 1:2:1) in a 10-percent aqueous solution of nitric acid is supplied into the middle part of the extraction column used in Example 1, and water and cyclohexanol are introduced respectively through the upper and lower ends of the column thereby to accomplish continuous counter-current extraction.

In an actual instance of practice, 89.7 percent of adipic acid, 57.3 percent of glutaric acid, and 9.7 percent of succinic were extracted by means of the cyclohexanol.

EXAMPLE 3

To 1 kg. of a mixture (1:1 weight ratio) of cyclohexanone and cyclohexanol, 2 kg. of acetic acid as a solvent and 0.5 gram (g.) each of cobalt acetate and manganese acetate as catalysts are added, and the resulting process batch is caused to undergo oxidation with oxygen for 3 hours at a reaction temperature of 85° C. When the product of oxidation is cooled, 810 g. of a crystalline substance is obtained. The purity of adipic acid in these crystals is 99.8 percent or higher.

By concentrating the resulting mother liquor at this stage to one half, crystals in a quantity of 90 g. are obtained. The purity of adipic acid in these crystals is 98 percent or higher, and the acid can be purified by directly recrystallizing these crystals.

By further concentrating the resulting mother liquor, 72 g. of yellow-colored crystals are obtained. These crystals contain 34 g. of adipic acid, 12 g. of glutaric acid, and 26 g. of succinic acid. These crystals are subjected to extraction under the same conditions as those set forth in Example 1 with the use of 1 kg. of a mixture of cyclohexanone and cyclohexanol.

As a result, in an actual instance of practice, the quantities of adipic acid, glutaric acid, and succinic acid extracted by means of the cyclohexanone-cyclohexanol mixture were 91.3 percent, 58.8 percent, and 12.8 percent, respectively.

EXAMPLE 4

The adipic acid, glutaric acid, and succinic acid obtained in Example 3 were extracted, and the mixture of cyclohexanone and cyclohexanol containing these acids was oxidized under the same conditions as specified in Example 3, whereupon 840 g. of crystals were obtained. The purity of adipic acid in these crystals was above 99.8 percent, and no coloration thereof whatsoever was observable.

The chromaticity at the time of melting of the adipic acid in the case where these crystals were recrystallized with nitric acid and recrystallized with water was 70 APHA, which was exactly the same as that in the case where adipic acid obtained from a fresh mixture of cyclohexanone and cyclohexanol was purified in the same manner.

COMPARISON EXAMPLE

The extraction of Example 1 was carried out under the same conditions as set forth therein except for the change of the extractant from cyclohexanone plus cyclohexanol to n-butanol. As a result, the extractabilities of adipic acid and succinic acid with respect to n-butanol were 90.8 percent and 21.2 percent, respectively, and the separation was extremely poor.

What is claimed is:

1. A process for separating and recovering adipic acid which comprises subjecting a dibasic-acid mixture comprising 20 to 70% by weight of adipic acid, 20–70% by weight of succinic acid, and 0–70% by weight of glutaric acid to an extraction operation in which said mixture is contacted with an extractant system consisting essentially of (1) a water phase and (2) a water-immiscible organic phase, said organic phase consisting essentially of a member selected from the group consisting of cyclohexanone, cyclohexanol, and mixtures thereof thereby to cause preferential extraction of adipic acid into said organic phase.

2. A process for recovering adipic acid according to claim 1 in which said extractant system comprises (1) water and (2) cyclohexanone and cyclohexanol.

3. A process for recovering adipic acid according to claim 1 in which the weight ratio in said extractant system of the water to said member is from 0.1 to 20.

4. A process according to claim 1 wherein the dibasic acid mixture, prior to the contacting of the mixture with said extractant system is first extracted with a selective solvent for glutaric acid, said selective solvent being chosen from the group consisting of benzene, nitrobenzene and chloroform.

5. A process for recovering adipic acid according to claim 1 wherein said dibasic acid mixture is prepared by air or nitric acid oxidation of cyclohexanone, cyclohexanol and mixtures thereof and wherein after the adipic acid has been extracted into said organic phase, the adipic acid is recovered from said organic phase and the residual organic phase comprising essentially cyclohexanone, cyclohexanol and mixtures thereof is then recirculated to said air or nitric acid oxidation.

6. A process for recovering adipic acid according to claim 1 wherein said dibasic acid mixture is prepared by air or nitric acid oxidation of cyclohexanone, cyclohexanol and mixtures thereof and crystallization of the adipic acid-containing product and wherein the organic phase containing the extracted adipic acid is recirculated to said oxidation step or to said crystallization step to recover the extracted adipic acid with the adipic acid-containing product.

References Cited
UNITED STATES PATENTS 2,978,473    4/1961    Chafitz et al. _____ 260—537 P VIVIAN GARNER, Primary Examiner U.S. Cl. X.R.

260—531 R, 537 P